United States Patent [19]
Morisawa et al.

[11] Patent Number: 5,895,333
[45] Date of Patent: Apr. 20, 1999

[54] HYBRID VEHICLE DRIVE SYSTEM, WHEREIN MECHANISM FOR SYNTHESIZING ENGINE AND MOTOR OUTPUTS IS DISPOSED ADJACENT TO TRANSMISSION

[75] Inventors: Kunio Morisawa; Seitoku Kubo, both of Toyota; Yutaka Taga, Aichi-ken, all of Japan

[73] Assignee: Toyota Jidosha Kabushiki Kaisha, Toyota, Japan

[21] Appl. No.: 08/730,663

[22] Filed: Oct. 11, 1996

[30] Foreign Application Priority Data

Oct. 18, 1995 [JP] Japan .................................. 7-269865

[51] Int. Cl.⁶ .................................................. B60K 6/00
[52] U.S. Cl. .................................................. 475/5; 477/7
[58] Field of Search .................................. 475/5; 477/7, 8, 477/9, 11, 12, 13, 14; 74/606 R

[56] References Cited

U.S. PATENT DOCUMENTS

| | | |
|---|---|---|
| 5,258,651 | 11/1993 | Sherman . |
| 5,285,111 | 2/1994 | Sherman . |
| 5,415,603 | 5/1995 | Tuzuki et al. . |
| 5,513,719 | 5/1996 | Moroto et al. . |
| 5,558,173 | 9/1996 | Sherman ........................ 180/53.8 |
| 5,558,175 | 9/1996 | Sherman ........................ 180/65.2 |
| 5,562,565 | 10/1996 | Moroto et al. ................... 477/8 X |
| 5,603,671 | 2/1997 | Schmidt ........................... 475/5 |
| 5,713,814 | 2/1998 | Hara et al. ....................... 477/5 |
| 5,730,676 | 3/1998 | Schmidt ......................... 477/9 X |
| 5,735,770 | 4/1998 | Omote et al. .................... 477/5 |
| 5,771,478 | 6/1998 | Tsukamoto et al. ............. 477/8 X |

FOREIGN PATENT DOCUMENTS

| | | |
|---|---|---|
| 41 02 202 | 8/1991 | Germany . |
| 7-135701 | 5/1995 | Japan . |
| WO 94/10001 | 5/1994 | WIPO . |

*Primary Examiner*—Dirk Wright
*Assistant Examiner*—Peter T. Kwon
*Attorney, Agent, or Firm*—Oliff & Berridge, PLC

[57] ABSTRACT

A hybrid vehicle drive system including an electric motor operated by electric energy, an engine operated by the combustion of a fuel, a transmission, and a synthesizer mechanism. The synthesizer includes a hydraulically operated clutch system and mechanically synthesizes the output of the engine and the output of the electric motor for transmitting a resultant of these outputs to the transmission. The synthesizer mechanism and the transmission are disposed adjacent to each other, to simplify piping arrangements for supplying the clutch system with a working fluid and lubricating the synthesizer mechanism and transmission.

16 Claims, 5 Drawing Sheets

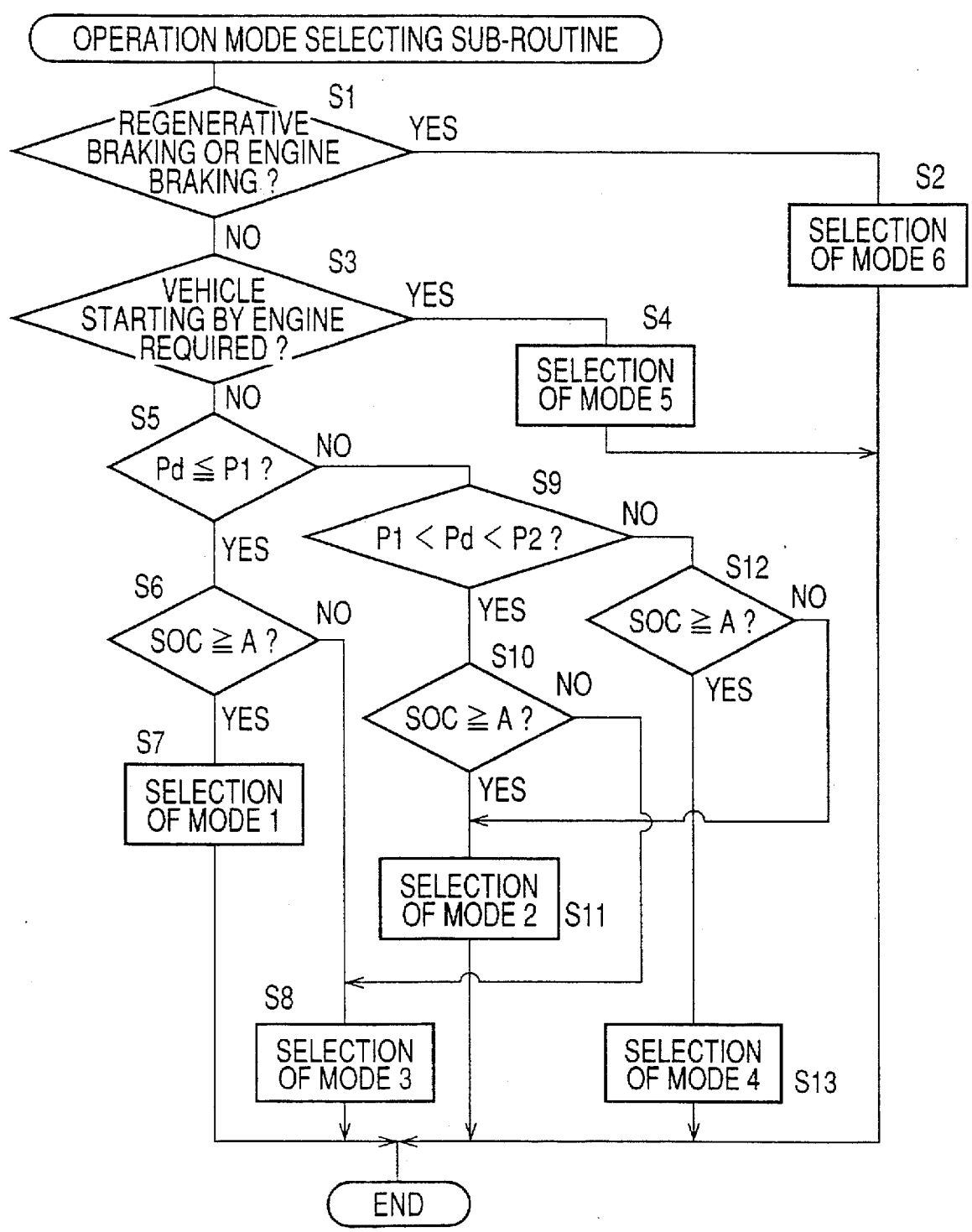

HYBRID VEHICLE DRIVE SYSTEM, WHEREIN MECHANISM FOR SYNTHESIZING ENGINE AND MOTOR OUTPUTS IS DISPOSED ADJACENT TO TRANSMISSION

BACKGROUND OF THE INVENTION

1. Field of the Invention

The present invention relates in general to a so-called hybrid drive system for driving a motor vehicle, and more particularly to improvements in such a hybrid drive system including a synthesizer mechanism for mechanically synthesizing outputs of an electric motor and an engine and transmitting a resultant of these outputs to a transmission.

2. Discussion of the Related Art

As a device for driving a vehicle such as an automobile, there has been proposed a hybrid drive system which is adapted to reduce exhaust gases and which includes (a) an electric motor operated by an electric energy, (b) an engine operated by combustion of a fuel, and (c) a synthesizer mechanism including hydraulically operated clutches and operatively connected to a transmission, for mechanically synthesizing an output of the electric motor and an output of the engine and transmitting a resultant of these outputs to the transmission. An example of such a hybrid drive system is disclosed in U.S. Pat. No. 5,258,651, wherein a planetary gear mechanism is employed as the synthesizer mechanism, and the electric motor is disposed radially outwardly of the synthesizer mechanism. In this hybrid drive system, the synthesizer mechanism, electric motor and engine are disposed coaxially with each other as an assembly within a single housing, and the transmission is connected to the output shaft of the synthesizer mechanism through a chain and is not disposed axially adjacent to the assembly.

Generally, the transmission indicated above incorporates hydraulically operated clutches and brakes for shifting actions, and requires lubrication of its components. Similarly, the synthesizer mechanism incorporates hydraulically operated clutches disposed between its components and between the components and the engine, and requires lubrication of its components. In the hybrid drive system wherein the transmission and the synthesizer mechanism are not disposed adjacent to each other, the hydraulic arrangement for the working fluid for the clutches and brakes and the lubrication arrangement tend to be undesirably complicated and suffer from difficult piping and formation of oil passages.

SUMMARY OF THE INVENTION

It is therefore an object of the present invention to provide a hybrid drive system for a motor vehicle, which is constructed to facilitate piping of the hydraulic and lubrication systems.

The above object may be achieved according to the principle of this invention, which provides a hybrid drive system for a motor vehicle, including an electric motor operated by an electric energy, an engine operated by combustion of a fuel, a transmission, and a synthesizer mechanism which includes hydraulically operated clutch means and which mechanically synthesizes an output of the engine and an output of the electric motor and transmitting a resultant of the outputs of the engine and the electric motor to transmission, wherein the the synthesizer mechanism and the transmission are disposed adjacent to each other.

In the present hybrid drive system of the present invention constructed as described above, the synthesizer mechanism and the transmission are disposed adjacent to each other, thereby facilitating the piping arrangements for supplying the hydraulically operated clutch means with a pressurized working fluid and for lubricating the synthesizer mechanism and transmission.

Preferably, the engine, the electric motor, the synthesizer mechanism and the transmission are disposed coaxially with each other in the order of description, so that the synthesizer mechanism and the transmission are axially adjacent to each other. In this respect, it is noted that the engine and the electric motor do not require the pressurized working fluid and lubrication oil, while the synthesizer mechanism and the transmission require the pressurized working fluid and lubrication oil. The present coaxial arrangement permits the engine and the electric motor to be disposed in a first portion of a common housing, while the synthesizer mechanism and the transmission are disposed in a second portion of the housing so that the second portion is suitably provided with oil passages for the working fluid for the clutch means, and is suitably sealed for lubrication of the synthesizer mechanism and transmission.

The synthesizer mechanism may include a three-element type gear device operated connected to the engine, electric motor and transmission through the hydraulically operated clutch means. The three-element type gear device may consist of a planetary gear set including a ring gear connected to the engine through the hydraulically operated clutch means, a sun gear connected to the electric motor, and a carrier connected to the transmission. Alternatively, the three-element type gear device may consist of a bevel gear type differential gear mechanism. The hydraulically operated clutch means may include a hydraulically operated clutch such as a single-disc or multi-disc type friction clutch disposed between the engine and the electric motor. The clutch means may further include another hydraulically operated clutch disposed between selected two elements of the three-element type gear device. Where the three-element type gear device is a planetary gear set, the drive system may be adapted such that a ring gear of the planetary gear set is connected to the engine through a first hydraulically operated clutch, and a sun gear and a carrier of the planetary gear set are connected to the electric motor and the input shaft of the transmission, respectively, while a second hydraulically operated clutch may be disposed between the sun gear and the carrier.

The transmission may consist of a gear type transmission having a plurality of gear or speed ratios. For instance, the gear type transmission may consist of a parallel-two axes transmission including an input shaft, an output shaft disposed in parallel with the input shaft, and a plurality of gear sets each of which consists of two mutually meshing gears that are provided on the input and output shafts, respectively.

The gear type transmission may incorporate hydraulically operated clutches or actuators for automatic shifting thereof, or manually operated clutches for manual shifting thereof. However, the transmission may be a continuously variable transmission, such as a toroidal type transmission, whose speed ratio can be continuously varied by a hydraulic actuator.

The present hybrid drive system may further include a damper disposed between the engine and the synthesizer mechanism. The damper may include a spring, a rubber member or any other elastic member for absorbing a fluctuation of a rotary motion of the engine. Where the engine, electric motor, synthesizer mechanism and transmission are disposed coaxially with each other in the order of description, the damper may be disposed between the engine and the electric motor. In this case, the electric motor may have a hollow output shaft through which a shaft extends for connecting the damper and the synthesizer mechanism.

The drive system may include a housing which has a first partition wall which divides the housing into a first portion and a second portion which are fluid-tightly separated from each other. In this case, the engine and the electric motor are accommodated in the first portion, while the synthesizer mechanism and the transmission are accommodated in the second portion. The housing may have a second partition wall which divides the second portion into two chambers which communicate with each other. Oil passages for supplying the hydraulic clutch means of the synthesizer mechanism may be provided in or at least partially defined by the first and second partition walls.

The hybrid drive system may further include an electric generator for generating the electric energy used for operating the electric motor. The electric motor may also function as the electric generator. Namely, the drive system may use a motor/generator which is selectively operated as the electric motor or the electric generator, depending upon the selected mode of operation of the drive system.

BRIEF DESCRIPTION OF THE DRAWINGS

The above and optional objects, features, advantages and technical and industrial significance of this invention will be better understood by reading the following detailed description of presently preferred embodiments of the invention, when considered in connection with the accompanying drawings, in which:

FIG. 3 is a flow chart illustrating a routine for selecting operation modes of the hybrid drive system of FIG. 1;

DETAILED DESCRIPTION OF THE PREFERRED EMBODIMENT

Figure 1:
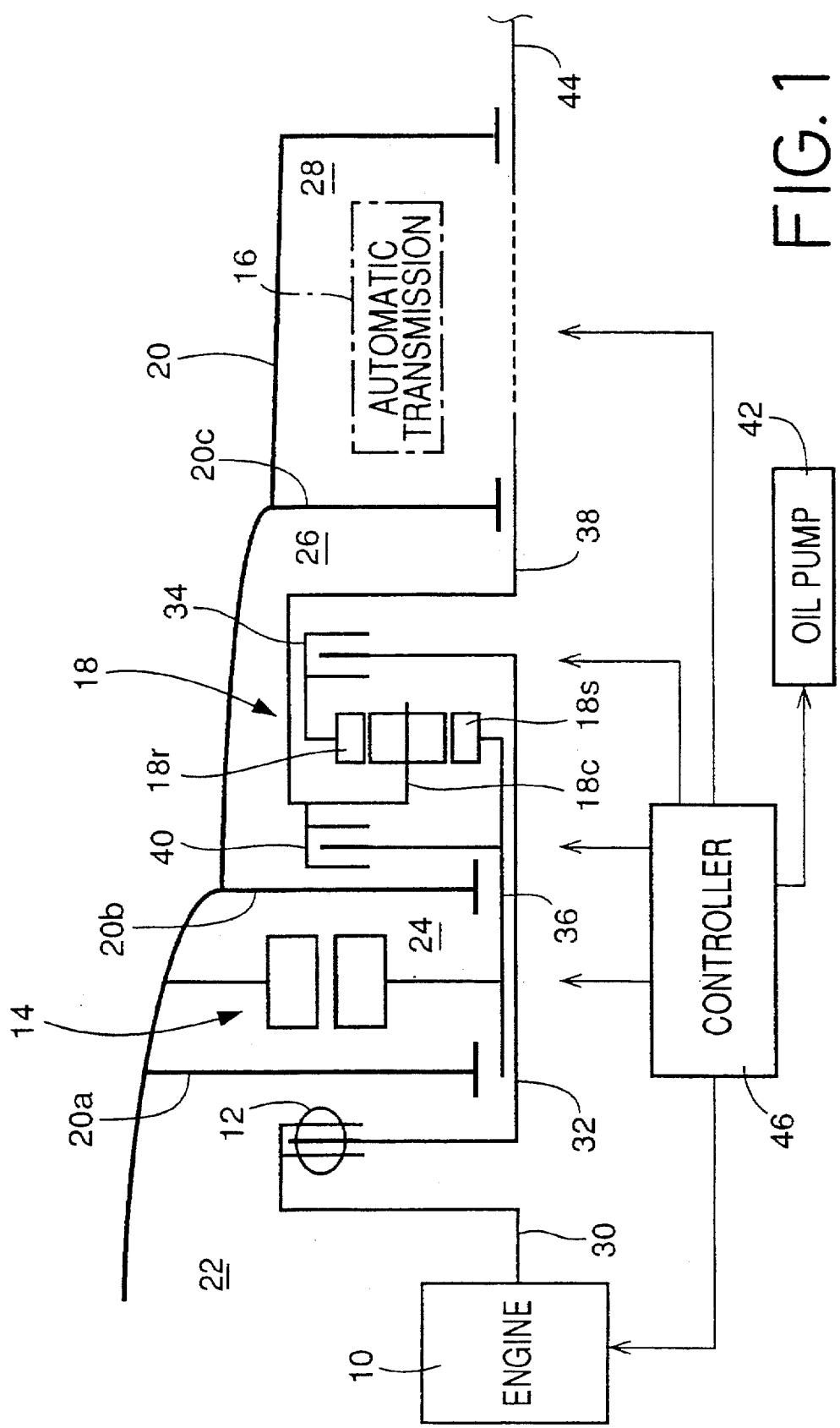
FIG. 1 is a schematic view showing an arrangement of a hybrid drive system constructed according to one embodiment of this invention.

Referring first to the schematic view of FIG. 1, the hybrid drive system shown therein is constructed according to one embodiment of this invention for driving a front-engine, rear-drive motor vehicle. The hybrid drive system includes an engine in the form of an internal combustion engine 10 operated by combustion of a fuel, a damper 12 of spring type provided for preventing a fluctuation of a rotary motion of the engine 10, an electric motor in the form of a motor/generator 14 operated by an electric energy, an automatic transmission 16, and a synthesizer mechanism 18 adapted to mechanically synthesize or combine an output of the engine 10 and an output of the motor/generator 14 and transmit a resultant of these outputs to the automatic transmission 16. The engine 10, damper 12, motor/generator 14, synthesizer mechanism 18 and automatic transmission 16 are disposed coaxially with each other in a housing 20 in the order of description. The synthesizer mechanism 18 is a three-element type gear device in the form of a planetary gear set.

The housing 20 of the hybrid drive system has three partition walls 20a, 20b, 20c, and is divided by these partition walls into four chambers 22, 24, 26 and 28. The first chamber 22 is open to the atmosphere and accommodates the engine 10 and the damper 12. The second chamber 24 is fluid-tightly sealed by oil seals provided on the axis of rotation of the drive system, and is thus protected against entry of water and lubricant. The second chamber 24 accommodates the motor/generator 14. The third and fourth chambers 26, 28 accommodate the synthesizer mechanism 18 and the automatic transmission 16, respectively, and communicate with each other. These communicating chambers 26, 28 are fluid-tightly sealed by oil seals, and are supplied with a lubricant for lubricating the synthesizer mechanism 18 and the automatic transmission 16. The second and third chambers 24, 26 are fluid-tightly separated from each other. It is noted that the schematic view of FIG. 1 shows only the upper half of the hybrid drive system, since the damper 12, motor/generator 14, synthesizer mechanism 18 and automatic transmission 16 are each substantially symmetrical with respect to the axis of rotation of the hybrid drive system.

The engine 10 has an output shaft in the form of a crankshaft 30, which is connected to an input shaft 32 of the planetary gear type synthesizer mechanism 18 through the damper 12. The input shaft 32 is connected to a ring gear 18r of the synthesizer mechanism 18 through a first hydraulically operated clutch 34. This first clutch 34 is a frictionally coupling device having friction discs or plates axially moved by a hydraulic actuator. The planetary gear set of the synthesizer mechanism 18 is a single pinion type, and has a sun gear 18s connected to an output shaft 36 of the motor/generator 14, and a carrier 18c connected to an input shaft 38 of the automatic transmission 16. The output shaft 36 of the motor/generator 14 is a hollow member through which the input shaft 32 of the synthesizer mechanism 17 extends. Between the sun gear 18s and the carrier 18c, there is disposed a second hydraulically operated clutch 40, which is also a frictionally coupling device provided with a hydraulic actuator. This second clutch 40 is disposed between the partition wall 20b and the synthesizer mechanism 18, and is supplied with a working fluid through oil passages provided in the partition wall 20b. On the other hand, the first clutch 34 is disposed between the partition wall 20c and the synthesizer mechanism 18, and is supplied with the working fluid through oil passages provided in the partition wall 20c. The working fluid is pressurized and delivered by an oil pump 42 driven by an electric motor. Thus, the hydraulic system for operating the first and second clutches 34, 40 includes the oil passages provided in the partition walls 20b, 20c.

Figure 2A:
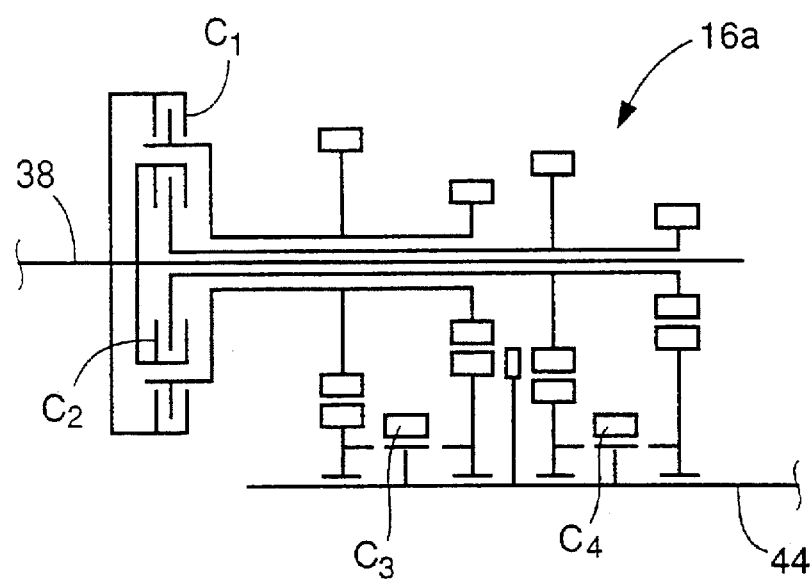
FIGS. 2A and 2B are schematic views illustrating two examples of an automatic transmission used in the hybrid drive system of FIG. 1.
Figure 2B:
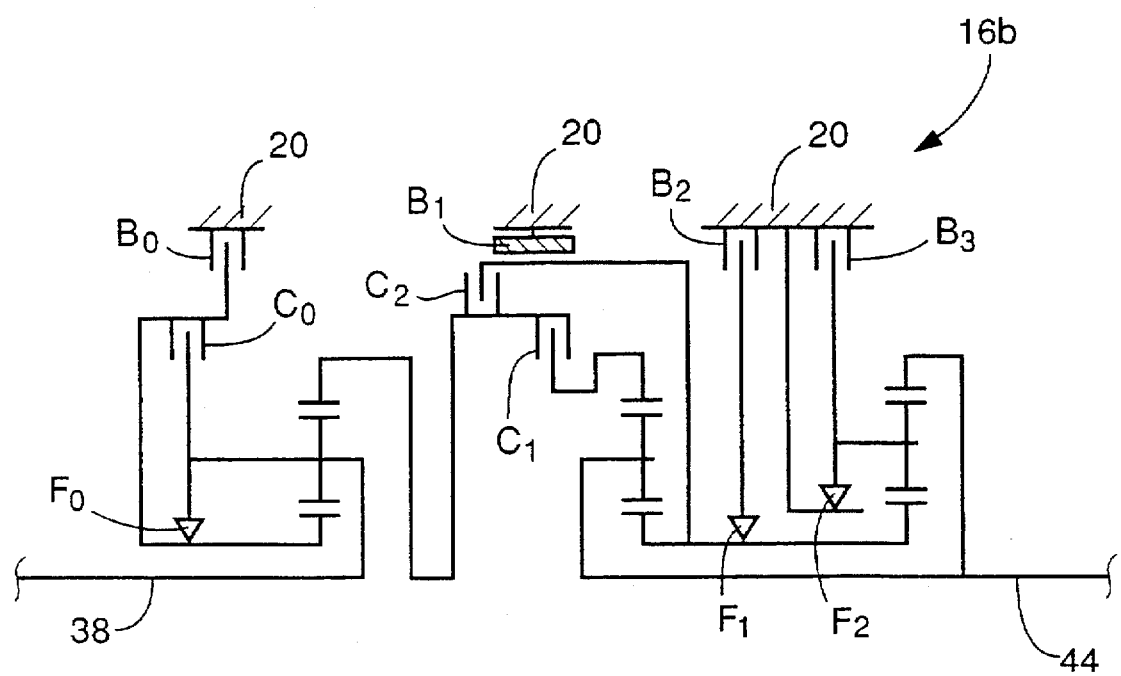

The automatic transmission 16 may be a transmission 16a of parallel two-axes type as shown in FIG. 2A, or a transmission 16b of planetary gear type as shown in FIG. 2B. In the parallel two-axes type transmission 16a of FIG. 2A, an output shaft 44 is disposed in parallel with the input shaft 38, and four sets of gears, each set consisting of two gears, are provided on the input and output shafts 38, 40 such that the two gears of each set are mounted on the input and output shafts 38, 40, respectively, and mesh with each other. The transmission 16a includes two hydraulically operated clutches C1, C2, each of which is a frictional coupling device having friction discs axially moved by a hydraulic actuator. The transmission 16a further includes two hydraulically operated clutches C3, C4, each of which has a sliding sleeve axially moved by a hydraulic actuator for coupling two gears. With the clutches C1–C4 selectively engaged and released, the transmission 16a is shifted to one of a neutral position for disconnection of the output shaft 40 from the input shaft 38, and four forward-drive positions for forward running of the vehicle. The transmission 16a may have an idling gear to provide a rear-drive position for backward running of the vehicle.

In the planetary gear type transmission 16b of FIG. 2B, the input and output shafts 38, 44 are disposed coaxially with each other. The transmission 16b includes three single-pinion planetary gear sets, hydraulically operated clutches C0, C1, C2 of frictional coupling type having friction discs, hydraulically operated brakes B0, B1, B2, B3, and one-way clutches F0, F1, F2. With the clutches C0–C2 and brakes B0–B3 selectively engaged and released, the transmission 16b is shifted to one of a neutral position, four forward-drive positions and a rear-drive position.

The working fluid is supplied from the oil pump 42 to the hydraulic actuators for the above-indicated hydraulically operated clutches and brakes of the automatic transmission 16, through oil passages provided in the partition wall 20c, other parts of the housing 20, and input and output shafts 38, 44. The output shaft 44 is connected to a propeller shaft of the vehicle, which in turn is connected through a final gear device to right and left rear drive wheels for driving the vehicle. It is noted that only the upper half of the output shaft 44 is shown in FIG. 2A, and only the upper halves of the input and output shafts 38, 44 are shown in FIG. 2B, since these shafts 38, 44 are each substantially symmetrical with respect to the axis of rotation.

The engine 10 and the motor/generator 14 are controlled by a controller 46. More specifically described, the controller 46 is adapted to control the opening angle of a throttle valve, the amount of fuel injection and the ignition timing of the engine 10, and selectively place the motor/generator 14 in one of a DRIVE state, a CHARGING state and a NON-LOAD state. In the DRIVE state, the motor/generator 14 is operated as an electric motor using electric energy supplied from an electric energy storage device in the form of a battery, for example, so as to provide a torque to be transmitted to the automatic transmission 16. In the CHARGING state, the motor/generator 14 is operated as an electric generator by regenerative braking (electrical braking torque of the motor/generator 14 per se), to charge the electric energy storage device. In the NON-LOAD state, the output shaft 36 of the motor/generator 14 is freely rotatable. The controller 46 is further adapted to control solenoid-operated valves for controlling the hydraulically operated clutches 34, 40 of the planetary gear type synthesizer mechanism 18, so as to selectively permit and inhibit power transmission between the engine 10 and the ring gear 18r, and power transmission between the sun gear 18s and the carrier 18c. The controller 46 is also adapted to control solenoid-operated valves for controlling the hydraulically operated clutches and brakes of the automatic transmission 16, for shifting the transmission 16 to the desired position.

The controller 46 uses a microcomputer incorporating a central processing unit (CPU), a random-access memory (RAM), and a read-only memory (ROM). The microcomputer performs data processing operations according to control programs stored in the ROM, which includes a program for executing an operation mode selecting sub-routine illustrated in the flow chart of FIG. 3, so that the hybrid drive system is placed in a selected one of six operation modes as indicated in TABLE 1. The controller 46 receives various signals such as the output signals of various detectors. These signals received by the controller 46 include a signal indicative of a torque $T_E$ of the engine 10, a signal indicative of a torque $T_M$ of the motor 14, a signal indicative of a rotating speed $N_E$ of the engine 10, a signal indicative of a rotating speed $N_M$ of the motor 14, a signal indicative of an output speed No of the automatic transmission 16 (which can be used to calculate the vehicle running speed), a signal indicative of an amount of operation $\theta_{AC}$ of an accelerator pedal of the vehicle, a signal indicative of an amount of electric energy SOC stored in the electric energy storage device, a signal indicative of an operation of a braking system of the vehicle, and a signal indicative of a currently selected position $L_{SH}$ of a shift lever of the vehicle. The engine torque $T_E$ may be obtained from the throttle valve opening or amount of fuel injection into the engine 10. The motor torque $T_M$ may be defined from the current of the motor/generator 14 in the DRIVE state, while the energy amount SOC may be obtained from the current or charging efficiency of the motor/generator 14 in the CHARGING state.

TABLE 1

| MODE | CLUTCH 34 | CLUTCH 40 | ENGINE 10 | BATTERY | OPERATING STATE OF HYBRID DRIVE SYSTEM |
|---|---|---|---|---|---|
| 1 | OFF | ON | OFF | DISCHARGE | MOTOR DRIVE |
| 2 | ON | ON | ON | NO ENERGY CONSUMPTION | ENGINE DRIVE |
| 3 | ON | ON | ON | CHARGE | ENGINE DRIVE CHARGING |
| 4 | ON | ON | ON | DISCHARGE | ENGINE.MOTOR DRIVE |
| 5 | ON | OFF | ON | CHARGE | STARTING BY ENGINE |
| 6 | OFF | ON | OFF | CHARGE | REGENERATIVE OR ENGINE BRAKING |

Referring to the flow chart of FIG. 3, there will be described the operation mode selecting sub-routine. This sub-routine is initiated with step S1 to determine whether a regenerative brake or engine brake is currently applied to the motor vehicle. This determination may be made depending upon whether the braking system is on, or whether the currently selected position $P_{SH}$ of the shift lever is a LOW position "L" or SECOND position "2" while the amount of operation $\theta_{AC}$ of the accelerator pedal is zero, or alternatively whether the amount of operation $\theta_{AC}$ of the accelerator pedal is zero. If an affirmative decision (YES) is obtained in step S1, the control flow goes to step S2 to select a MODE 6. In this MODE 6, the first hydraulically operated clutch 34 is released or turned OFF, and the second hydraulically operated clutch 40 is engaged or turned ON, while the motor/generator 14 is placed in the CHARGING state, with the engine 10 held off, as indicated in TABLE 1, whereby a regenerative brake is applied to the vehicle, as in the case of engine braking, and the electric energy corresponding to the braking force produced by the regenerative brake is stored in the electric energy storage device. In the MODE 6 in which the second clutch 40 is engaged while the first clutch 34 is released, the planetary gear type synthesizer mechanism 18 is rotated as a unit, while it is disconnected from the engine 10, whereby the regenerative braking can be obtained with high energy efficiency with a reduced power loss. The controller 46 may be adapted to inhibit the MODE 6 if the amount of electric energy SOC stored in the storage device is larger than a predetermined threshold.

If a negative decision (NO) is obtained in step S1, the control flow goes to step S3 to determine whether a start of the vehicle by the engine 10 is required or not. This determination may be effected depending upon whether the engine 10 is in operation with the amount of operation $\theta_{AC}$ of the accelerator pedal being not zero while the vehicle running speed (output shaft speed No) is zero. If an affirmative decision (YES) is obtained in step S3, the control flow goes to step S4 to select a MODE 5. In this MODE 5 in which the first and second clutches 34, 40 are engaged and released, respectively, while the engine 10 is operated with a torque of the motor/generator 14 being controlled, as indicated in TABLE 1, whereby the vehicle is started. Explained more specifically, a gear ratio $\rho$ of the synthesizer mechanism 18 is defined by a ratio of the number of teeth of the sun gear 18s to the number of teeth of the ring gear 18r, the torque $T_E$ of the engine 10, the output torque $T_O$ of the synthesizer mechanism 18 and the torque $T_M$ of the motor/generator 14 satisfy the following relationship:

$$T_E : T_O : T_M = 1 : (1+\rho) : \rho$$

If the gear ratio $\rho$ is about 0.5, the torque $T_M$ of the motor/generator 14 is about a half of the torque $T_E$ of the engine 10, and a torque equal to the engine torque $T_E$ multiplied by about 1.5 is generated from the carrier 18c. When the motor/generator 14 is placed in the NON-LOAD state without an electric current applied thereto, the output shaft 36 is rotated in the reverse direction, and no output is generated from the carrier 18c, whereby the vehicle is in a stop. In this case, the synthesizer mechanism 18 functions as a vehicle starting clutch and a torque amplifying device, permitting the vehicle to be smoothly started by an output torque equal to the engine torque $T_E$ multiplied by $(1+\rho)$, with a gradual increase in the motor torque $T_M$ (motor current).

If a negative decision (NO) is obtained in step S3, the control flow goes to step S5 to determine whether an output Pd currently required to drive the vehicle is equal to or smaller than a first threshold value P1. The currently required output Pd is an output necessary to drive the vehicle against a running resistance applied thereto, and can be calculated on the basis of the amount of operation $\theta_{AC}$ of the accelerator pedal or the rate of change of this value $\theta_{AC}$, and the vehicle running speed (output speed No) and the currently selected position of the automatic transmission 16, and according to a predetermined relationship represented by a data map or equation stored in the controller 46. If an affirmative decision (YES) is obtained in step S5, the control flow goes to step S6 to determine whether the amount of electric energy SOC stored in the electric energy storage device is equal to or larger than a predetermined lower limit A. If an affirmative decision (YES) is obtained in step S6, the control flow goes to step S7 to select a MODE 1. If a negative decision (NO) is obtained in step S6, the control flow goes to step S8 to select a MODE 3. The lower limit A is a minimum required amount of the electric energy stored in the storage device, which amount is required to operate the motor/generator 14 as the electric motor for driving the vehicle. This lower limit A is determined depending upon the discharging and charging efficiencies of the electric energy storage device. For instance, the lower limit A is about 70% of the full capacity of the storage device.

In the MODE 1, the first and second clutches 34, 40 are released and engaged, respectively, and the motor/generator 14 is operated to provide the required output Pd, with the engine 10 held off, as indicated in TABLE 1. In this mode, only the electric motor 14 is operated as the drive power source to drive the vehicle. As in the MODE 6, the electric motor 14 can be driven with high efficiency with a reduced power loss, with the automatic transmission 16 placed in the appropriate gear position. In the MODE 3, the first and second clutches 34, 40 are both engaged, and the engine 10 is operated with the motor/generator 14 placed in the CHARGING state with regenerative braking, as indicated in TABLE 1, so that the vehicle is driven by the output of the engine 10 while the electric generator 14 is operated to charge the electric energy storage device. In this case, the engine 10 is operated so as to provide an output larger than the required output Pd, while the electric generator 14 is operated by surplus power which is equal to the output of the engine 10 minus the required output Pd. That is, the electric current applied to the electric generator 14 is controlled by the controller 46 so that the amount of energy consumption by the electric generator 14 corresponds to the surplus power.

If a negative decision (NO) is obtained in step S5, that is, the currently required output Pd is larger than the first threshold value P1, the control flow goes to step S9 to determine whether the currently required output Pd is larger than the first threshold value P1 and is smaller than a predetermined second threshold value P2. If an affirmative decision (YES) is obtained in step S9, the control flow goes to step S10 to determine whether the amount of energy SOC stored in the storage device is equal to or larger than the lower limit. If an affirmative decision (YES) is obtained in step S10, the control flow goes to step S11 to select a MODE 2. If a negative decision (NO) is obtained in step S10, the control flow goes to step S8 to select the MODE 3. In the MODE 3, the first and second clutches 34, 40 are both engaged, and only the engine 10 is operated as the drive power source, so as to provide the required output Pd, with the motor/generator 14 placed in the NON-LOAD state, so that the vehicle is driven by the engine 10 only.

If a negative decision (NO) is obtained in step S9, that is, the currently required output Pd is equal to or larger than the second threshold value P2, the control flow goes to step S12 to determine whether the amount of electric energy SOC is equal to or larger than the lower limit A. If an affirmative decision (YES) is obtained in step S12, the control flow goes to step S13 to select a MODE 4. If a negative decision (NO) is obtained in step S12, the control flow goes to step S11 to select the MODE 2. In the MODE 4, the first and second clutches 34, 40 are both engaged, and the engine 10 and the electric motor 14 are both operated as the drive power sources to drive the vehicle.

As discussed above, if the amount of electric energy SOC is equal to or larger than the lower limit A, one of the MODE 1, MODE 2 and MODE 4 is selected depending upon the load acting on the vehicle. Namely, the controller 46 selects the MODE 1 in step S7 to operate only the electric motor 14 as the drive power source to drive the vehicle under a relatively low load condition, that is, while the currently required output Pd is equal to or smaller than the first threshold value P1. The controller 46 selects the MODE 2 in step S11 to operate only the engine 10 as the drive power source to drive the vehicle under a medium load condition, that is, while the required output Pd is larger than the first threshold value P1 and smaller than the second threshold value P2, and selects the MODE 4 in step S13 to operate both the engine 10 and the electric motor 14 as the drive power sources to drive the vehicle under a relatively high load condition, that is, while the required output Pd is equal to or larger than the second threshold value P2. The first and second threshold values P1, P2 are determined so as to minimize the amount of consumption of the fuel by the engine 10 and the amount of exhaust gases emitted from the engine, on the basis of the fuel consumption rate (amount of fuel consumption per unit power) and the exhaust gas emission rate (amount of exhaust gases per unit power) of the engine 10, and the energy conversion efficiency of the motor/generator 14.

In the present hybrid drive system embodying the present invention, the engine 10, damper 12, motor/generator 14, planetary gear type synthesizer mechanism 18 and automatic transmission 16 are disposed coaxially with each other in the order of description within the housing 20 such that the synthesizer mechanism 18 is located adjacent to the automatic transmission 16. The synthesizer mechanism 18 and the automatic transmission 16 require the lubrication oil and the working oil, while the engine 10, damper 12 and motor/generator 14 do not require the lubrication oil and the working oil. The engine 10, damper 12 and motor/generator 14 are disposed on one side of the partition wall 20b of the housing 20, while the synthesizer mechanism 18 and the automatic transmission 16 are disposed on the other side of the partition wall 20b. This arrangement facilitates the piping for supplying the working oil to the hydraulically operated clutches and brakes incorporated in the synthesizer mechanism 18 and automatic transmission 16, also facilitates the piping and sealing for the lubrication oil for the synthesizer mechanism 18 and automatic transmission 16.

It is noted that the motor/generator 14 and the damper 12 (which includes a flywheel) have relatively large outside diameters, and may be suitably installed in a space adjacent to the engine 10, in place of a torque converter with a relatively large outside diameter, which is used in a conventional drive system wherein the output of an engine is transferred to an automatic transmission through the torque converter. The installation of the motor/generator 14 and the damper 12 adjacent to the engine 10 is also desirable for simplifying the piping arrangements required for the synthesizer mechanism 18 and automatic transmission 16, since these components 18, 16 can be disposed adjacent to each other.

The planetary gear type synthesizer mechanism 18 and the clutches 34, 40 are installed in place of an overdrive mechanism in the conventional drive system. Thus, the present hybrid drive system may utilize a considerably large number of components of the conventional drive system, such as a transmission device, and a control arrangement and a housing or casing for the transmission device.

While the presently preferred embodiment of this invention has been described above in detail by reference to FIGS. 1-3, it is to be understood that the invention may be otherwise embodied.

Figure 4:
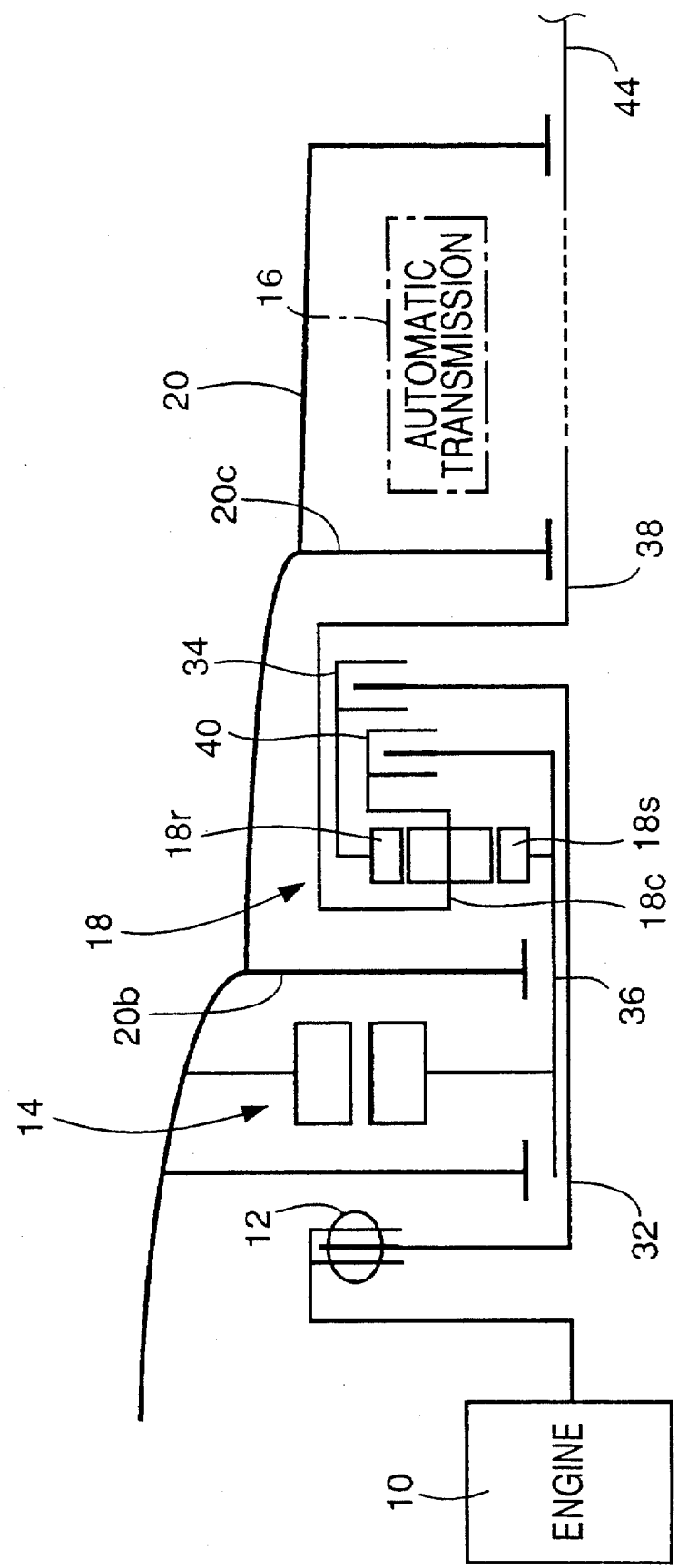
FIG. 4; and is a schematic view showing a hybrid drive system according to another embodiment of the invention.
Figure 5:
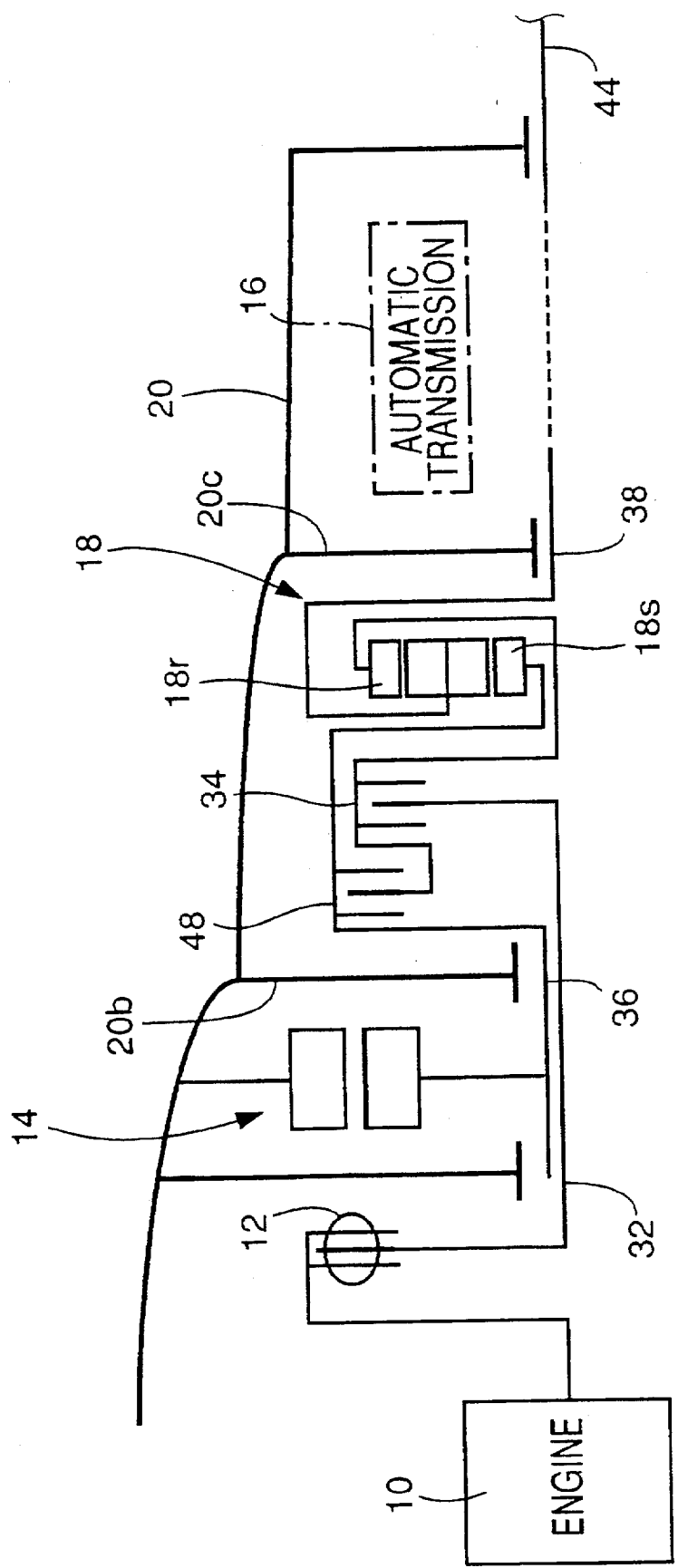
FIG. 5 is a a schematic view of a hybrid drive system according to a further embodiment of the invention.

In the embodiment described above, the first and second hydraulically operated clutches 34, 40 are disposed on the opposite sides of the planetary gear type synthesizer mechanism 18. However, these two clutches may be disposed on the same side of the synthesizer mechanism 18 as shown in FIGS. 4 and 5. In the embodiment of FIG. 5, the second hydraulically operated clutch 48 is interposed between the sun gear 18s and the ring gear 18r of the planetary gear type synthesizer mechanism 18. In the embodiments of FIGS. 4 and 5, the oil passages for the first clutch 34 are provided in the partition wall 20c, while the oil passages for the second clutch 40, 48 are provided in the partition wall 20b.

Although the first embodiment has the six operation modes, the number of the operation modes may be suitably determined. The planetary gear type synthesizer mechanism 18 may incorporates a hydraulically operated brake for fixing the ring gear 18r to the housing 20, in addition to the two hydraulically operated clutches 34, 40.

It is to be understood that the present invention may be embodied with various other changes, modifications and improvements, which may occur to those skilled in the art.

What is claimed is:

1. A hybrid drive system for a motor vehicle, including an electric motor operated by an electric energy, an engine operated by combustion of a fuel, a transmission, and a synthesizer mechanism which includes hydraulically operated clutch means and which mechanically synthesizes an output of said engine and an output of said electric motor for transmitting a resultant of said outputs of said engine and said electric motor to said transmission, wherein an improvement comprises:

said synthesizer mechanism and said transmission being disposed adjacent to each other; and a housing which has a partition wall which divides said housing into a first portion and a second portion which are fluid-tightly separated from each other, said engine and said electric motor accommodated in said first portion and said synthesizer mechanism and said transmission accommodated in said second portion.

2. A hybrid drive system according to claim 1, wherein said synthesizer mechanism includes a three-element type gear device operatively connected to said engine, said electric motor and said transmission through said hydraulically operated clutch means.

3. A hybrid drive system according to claim 1, wherein said transmission consists of a gear type transmission having a plurality of speed ratios.

4. A hybrid drive system according to claim 3, wherein said gear type transmission consists of a parallel two-axes transmission including an input shaft, an output shaft disposed in parallel with said input shaft, and a plurality of gear sets each of which consists of two mutually meshing gears that are provided on said input and output shafts, respectively.

5. A hybrid drive system according to claim 3, wherein said gear type transmission consists of a planetary gear type transmission.

6. A hybrid drive system according to claim 3, wherein said gear type transmission incorporates hydraulically operated actuators for automatic shifting of said gear type transmission.

7. A hybrid drive system according to claim 1, further including a damper disposed between said engine and said synthesizer mechanism.

8. A hybrid drive system according to claim 1, wherein said housing has a second partition wall which divides said second portion into two chambers which communicate with each other.

9. A hybrid drive system according to claim 8, further comprising a hydraulic system for operating said hydraulically operated clutch means, said hydraulic system including means for defining oil passages provided in said first and second partition walls.

10. A hybrid drive system according to claim 1, further including an electric generator for generating said electric energy used for operating said electric motor.

11. A hybrid drive system according to claim 10, wherein said electric motor functions also as said electric generator.

12. A hybrid drive system for a motor vehicle, including an electric motor generated by an electric energy, an engine operated by combustion of a fuel, a transmission, and a synthesizer mechanism which includes hydraulically operated clutch means and which mechanically synthesizes an output of said engine and an output of said electric motor for transmitting a resultant of said outputs of said engine and said electric motor to said transmission, wherein an improvement comprises:

said synthesizer mechanism and said transmission being disposed adjacent to each other; and said engine, said electric motor, said synthesizer mechanism and said transmission are disposed coaxially with each other in the order of description, so that said synthesizer mechanism and said transmission are axially adjacent to each other.

13. A hybrid drive system for a motor vehicle, including an electric motor generated by an electric energy, an engine operated by combustion of a fuel, a transmission, and a synthesizer mechanism which includes hydraulically operated clutch means and which mechanically synthesizes an output of said engine and an output of said electric motor for transmitting a resultant of said outputs of said engine and said electric motor to said transmission, wherein an improvement comprises:

said synthesizer mechanism and said transmission being disposed adjacent to each other; and said synthesizer mechanism including a three-element type gear device operatively connected to said engine, said electric motor and said transmission through said hydraulically operated clutch means, said three-element type gear device consisting of a planetary gear set including a ring gear connected to said engine through said hydraulically operated clutch means, a sun gear connected to said electric motor, and a carrier connected to said transmission.

14. A hybrid drive system according to claim 13, wherein said hydraulically operated clutch means includes a first hydraulically operated clutch disposed between said engine and said ring gear, and a second hydraulically operated clutch disposed between two elements selected from said ring gear, said sun gear and said carrier.

15. A hybrid drive system according to claim 14, wherein said two elements consist of said sun gear and said carrier.

16. A hybrid drive system for a motor vehicle, including an electric motor operated by an electric energy, an engine operated by combustion of a fuel, a transmission, a synthesizer mechanism, and a damper disposed between said engine and said synthesizer mechanism, said synthesizer mechanism including hydraulically operated clutch means and which mechanically synthesizes an output of said engine and an output of said electric motor for transmitting a resultant of said outputs of said engine and said electric motor to said transmission, wherein an improvement comprises:

said synthesizer mechanism and said transmission being disposed adjacent to each other; and said engine, said damper, said electric motor, said synthesizer mechanism and said transmission being disposed coaxially with each other in the order of description, said electric motor having a hollow output shaft, and said damper being connected to said synthesizer mechanism through a shaft extending through said hollow output shaft.

* * * * *